T. A. BOOR.
HOSE CLAMP.
APPLICATION FILED SEPT. 26, 1916.
1,224,063.
Patented Apr. 24, 1917.
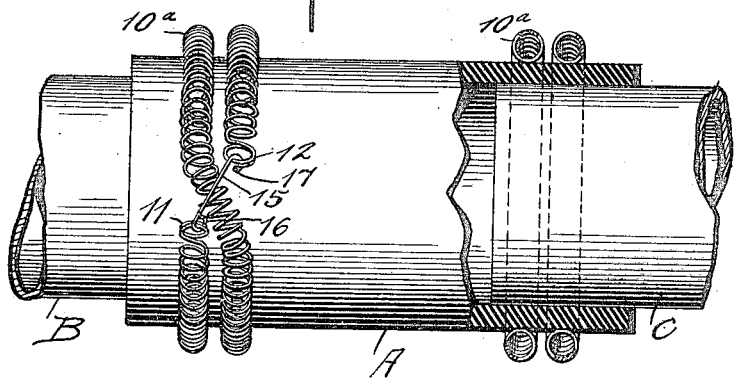
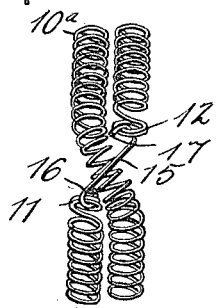
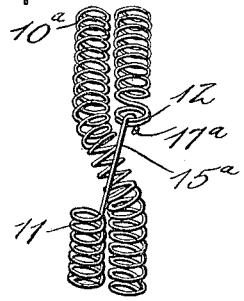
WITNESSES
INVENTOR
THEODORE A BOOR
BY
ATTORNEYS

UNITED STATES PATENT OFFICE.

THEODORE A. BOOR, OF ASHVILLE, OHIO.

HOSE-CLAMP.

1,224,063.   Specification of Letters Patent.   Patented Apr. 24, 1917.

Original application filed December 15, 1914, Serial No. 877,336. Divided and this application filed September 26, 1916. Serial No. 122,291.

*To all whom it may concern:*

Be it known that I, THEODORE A. BOOR, a citizen of the United States, and a resident of Ashville, in the county of Pickaway and State of Ohio, have invented certain new and useful Improvements in Hose-Clamps, of which the following is a specification.

The invention herein described was disclosed in my prior application, Serial No. 877,336, filed December 15, 1914, and of which the present application is a division, and relates to hose clamps more particularly designed for use in clamping the hose employed on automobiles to connect the water supply with the radiator, and with the use of the metallic clamps on the hose of an automobile, the severe vibrations and jars to which the vehicle is subjected tend to loosen the clamps and therefore require that the latter be made very tight. In tightening the usual clamps the rigid members composing the same subject the hose to severe pressure, and frequent puncture of the hose or mutilation of it results thereby producing leaks.

The prime object of this invention is to provide a hose clamp in the form of convolute elastic band which may be readily attached and detached, and which will exert the necessary compression on the hose without damaging the latter, while at the same time the clamp will very effectively resist the jarring and vibration to which it is subjected when employed on an automobile.

The invention will be particularly explained in the specific description following, reference being had to the accompanying drawings forming part of this specification in which similar reference characters indicate corresponding parts in the several views, and in which—

Figure 1 is a side elevation partly in section showing my improved hose clamp applied to a piece of hose and elements to be connected by the hose, said elements being conventionally shown.

Fig. 2 is a side elevation of a clamp slightly differing from Fig. 1.

Fig. 3 is a side elevation of a modified form of clamp.

In Fig. 1 two of my improved clamps 10$^a$ are shown on a hose A to clamp the hose in position on elements B, C, to establish communication between said elements. In producing my improved clamp the elastic compression band 10$^a$ is formed of a helical spring the length of which is so proportioned to the periphery of the hose that the coils or convolutions forming the band will need to be distended in order to encircle the hose and permit the terminal members 11 and 12 to be united. In this way the reaction of the elastic band will have a compressing action on the hose thereby firmly clamping the same on to the element B or C so as to form a water tight connection. The resiliency of the compression band, however, is such that no puncture or cutting of the hose will result. Moreover, the jarring to which the hose and its clamp are subjected will be resisted by the clamp and the latter maintained firmly against displacement.

As set forth the elastic compression band 10$^a$ is in convoluted form and presents a crossing portion of a convolution between the terminals 11 and 12. The terminals are detachably connected by a fastening element 15 ranging across the crossing portion of the convolution of the band, such fastening element as shown in Figs. 1 and 2, being separate from the spring coil and having an eye 16 embracing the terminal convolution of the coil at one end of the latter. The said element 15 is of a length to range across the said crossing portion of a convolution of the band, and the end opposite the eye is given the form of a hook 17 to engage the end of the adjacent terminal of the coil.

In Fig. 2 the fastening element 15 is fastened at one end by an eye to one terminal of the spring coil and extends obliquely across the crossing convolution of the band and terminates in a hook 17 to engage the adjacent terminal of the coil. The eye 16 and the hook 17 are similar to the eye and hook of Fig. 1 except that in Fig. 1 the eye and the hook are formed at the same side of the member 15 whereas in Fig. 2 the eye 16 and hook 17 are on opposite sides of the member, said member having the general form of an S-hook.

In the form shown in Fig. 3 the compression band is similar to that shown in Figs. 1 and 2. The fastener element 15$^a$ is integral at one end with a terminal on the spring coil, and is of a length to range across the crossing convolution of the band, the opposite terminal being engaged by the hooked end 17$^a$ of the fastener element.

The plurality of cross convolutions has an increased clamping effect on the hose and resists to a great degree the jarring action to which the hose is subjected, and by providing the connecting member across such convolution, the full clamping effect of the band throughout its whole length is obtained.

I claim:—

1. A hose clamp presenting a helical spring forming a convolute elastic compression band presenting terminal ends at opposite sides of an intermediate convolution and fastening means detachably connected to said ends and having a member ranging obliquely across the said convolution.

2. A hose clamp presenting a helical spring forming a convolute elastic compression band presenting terminal ends at opposite sides of an intermediate convolution, and fastening means detachably uniting said ends, said means consisting of an eye at one end engaging a coil of one convolution, a straight portion and ranging obliquely across the intermediate convolution and a hook at the other end engaging the end of another convolution.

3. A hose clamp comprising a helical band presenting a crossing portion of a convolution between the terminal ends of the band, and fastening means detachably connected to said terminals and ranging obliquely across said crossing portion of the convolution.

4. A hose clamp comprising a helical band presenting a crossing portion of a convolution between the terminal ends of the band and fastening means detachably uniting said terminals, said means consisting of a bar having an eye at one end engaging a coil of one terminal and a hook at the opposite end engaging the opposite terminal, said bar ranging obliquely across the crossing portion of the convolution.

THEODORE A. BOOR.